July 10, 1928.

H. D. GEYER

SPRING SHACKLE

Filed Jan. 21, 1927

1,676,490

Harvey D. Geyer Inventor

By Spencer Hardman & Fehr his Attorneys

Patented July 10, 1928.

1,676,490

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

SPRING SHACKLE.

Application filed January 21, 1927. Serial No. 162,605.

This invention relates to non-metallic couplings between two relatively movable parts, and has particular application to the couplings between the supporting springs and the chassis of automobiles.

An object of this invention is to provide an improved form of rubberized fabric suspension shackle for automobiles which will give improved efficiency and longer life in use than similar types heretofore designed.

A more specific object is to provide such a shackle which will prevent high edge loading on the rubberized fabric web and hence eliminate the danger of a sudden failure of the fabric web due to excessive edge loading thereupon when the automobile makes a turn or under any other circumstances when there is a tendency for the automobile body to sway laterally.

Further objects and advantages of the present invention will be apparent from the following description, reference being had to the accompanying drawings wherein a preferred embodiment of one form of the present invention is clearly shown.

In the drawing.

Similar reference characters refer to similar parts throughout the drawing.

Figure 1:
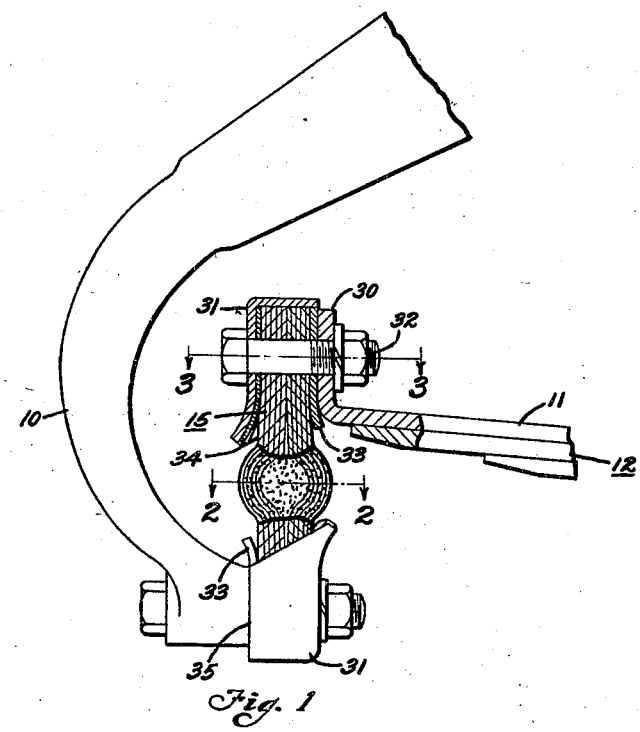
Fig. 1 illustrates the rear end of an automobile chassis side rail suspended from the rear end of the rear spring by means of a shackle built according to this invention. A portion of the shackle is shown in vertical section.
Figures 2, 4:
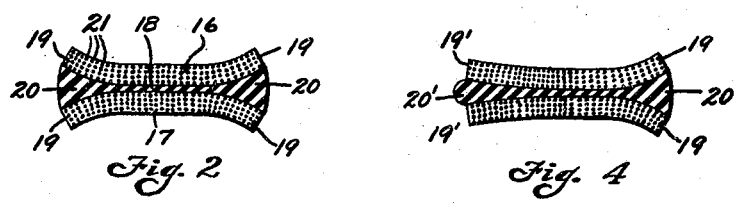
Fig. 2 is a horizontal section on line 2—2 of Fig. 1.
Fig. 4 is a view similar to Fig. 2, but illustrates the distortion of the fabric web under high edge loading at the left edge, as viewed in Fig. 4, whereby the edge load is distributed over a substantial width of the fabric web.
Figure 3:
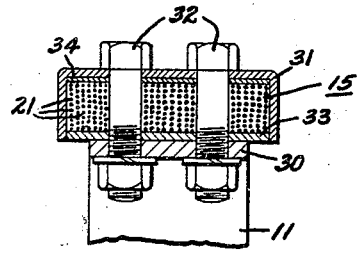
Fig. 3 is a horizontal section on line 3—3 of Fig. 1.

Numeral 10 designates the downwardly curved horn on the rear end of the chassis side rail. 11 is the long leaf of the rear spring 12 which supports the chassis frame thru the flexible suspension link 15. This link 15 comprises two rubberized fabric webs 16 and 17 which are vulcanized together with a relatively thin layer of elastic rubber 18 therebetween. At the central section, on line 2—2 of Fig. 1, the lateral edges of the fabric webs 16 and 17 are flared out in somewhat conical form, as shown at 19 in Fig. 2, and the cone-shaped space therebetween filled with small elastic rubber cones 20 which are continuous with the layer 18 at the apexes thereof. Fig. 2 shows the normal cross section of the molded unit 15 as it comes from the vulcanizing mold, the elastic rubber portions 20 and 18 of course being firmly bonded by vulcanization to the rubberized fabric webs 16 and 17. These fabric webs 16 and 17 are preferably made of cord-fabric with the substantially non-extensible cords 21 extending in the direction clearly illustrated.

The upper end of the molded unit 15 is rigidly clamped to the up-turned end 30 of spring leaf 11 by the clamping plate 31 and the two thru bolts 32. Preferably two interior clamping plates 33 and 34 having horizontal flutes or corrugations therein are provided in order to obtain a better grip on the molded fabric unit.

The lower end of the unit 15 is similarly rigidly clamped to the flat face 35 of the horn 10.

This flexible molded unit 15 carries the weight of the automobile body by tension, as is obvious, and is very easily flexed in the direction to permit longitudinal movement of the end of the spring 12. The elastic rubber layer 18 facilitates such longitudinal flexing since it permits an easier relative sliding of the fabric portion 16 to the fabric portion 17.

When the automobile turns more or less sharply, the centrifugal force of the body tends to tilt the body upon its supporting springs, thereby causing a high edge loading upon the fabric links 15. At such times the conically flared edges 19' on the edge which is loaded tend to straighten out by compressing the elastic rubber cone 20' therebetween, as shown on the left side of Fig. 4. It is thus seen that the lateral edges of the unit 15 are yieldably slightly extensible, while the remaining portion thereof is substantially non-extensible due to the cords 21 in this portion being straight. This feature of course reduces the maximum stresses on the fabric at the edges of the molded unit by distributing this edge loading over a substantial width of the fabric webs.

As soon as the edge loading is relieved, the elastic rubber cone 20 regains its form, thus maintaining the normal tension load on the cords of the flared edges 19. In other words, the yieldability of the edge portions of the flexible link 15 does not prevent these edge portions from taking their share of the normal tension load.

While the form of embodiment of the present invention, as herein disclosed, constitutes a preferred form, it is to be understood that other forms might be adopted, all coming within the scope of the claims which follow.

What is claimed is as follows:

1. A suspension shackle for two relatively movable parts comprising: a flexible web of molded rubberized fabric having its end portions rigidly secured to said movable parts respectively, the central portion of said flexible web being substantially non-extensible while the lateral edges of said web are slightly yieldable under tension load, whereby edge loading upon said flexible web is distributed over a substantial width thereof.

2. A suspension shackle for two relatively movable parts comprising: a flexible web of molded rubberized fabric having its end portions rigidly secured to said movable parts respectively, the central portion of said flexible web being substantially non-extensible, while the edge portions thereof are yieldable under tension load, the degree of yieldability being greatest at the very edge of said web and decreasing gradually toward the center theerof.

3. A spring suspension for vehicles comprising a flexible rubberized fabric web rigidly held at its opposite ends to related relatively movable parts of the vehicle, said fabric web having elastic rubber interposed therein at its edge portions to cause bulges in the fabric web, whereby the lateral edge portions of said web are rendered yieldable under tension loads.

4. In combination with a vehicle having a chassis and a spring, a molded flexible rubberized fabric web rigidly clamped at its opposite ends to said spring and chassis respectively, said fabric web having elastic rubber molded therein at its edge portions to cause bulges therein, whereby the lateral edges of said web are rendered more yieldable under tension loads than the central portion of said web.

5. In combination with a vehicle having a chassis and a spring, a suspension shackle connecting said chassis and spring, comprising: a flexible molded unit having a plurality of layers of non-extensible rubberized cord fabric extending in the direction of the tension load, and elastic rubber molded between certain layers of the cord fabric at the edge portions of said unit, whereby said edge portions are rendered somewhat yieldable under tension loads.

6. In combination with a vehicle having a chassis and a spring, a suspension shackle connecting said chassis and spring comprising: a flexible molded unit having a plurality of layers of non-extensible rubberized cord fabric extending in the direction of the tension load, and elastic rubber molded between the layers of the cord fabric to give cone-shaped bulges in the fabric at the edge portions, the base of said cones lying at the lateral edge of the molded unit.

In testimony whereof I hereto affix my signature.

HARVEY D. GEYER.